(12) United States Patent
Bensemann et al.

(10) Patent No.: US 10,906,533 B2
(45) Date of Patent: Feb. 2, 2021

(54) METHOD FOR MANOEUVRING A MOTOR VEHICLE INTO A PARKING SPACE WITH DETERMINATION OF A PARKING TRAJECTORY, DRIVER ASSISTANCE SYSTEM AND MOTOR VEHICLE

(71) Applicant: VALEO Schalter und Sensoren GmbH, Bietigheim-Bissingen (DE)

(72) Inventors: Rolf Bensemann, Bietigheim-Bissingen (DE); Markus Heimberger, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 137 days.

(21) Appl. No.: 16/305,966

(22) PCT Filed: May 24, 2017

(86) PCT No.: PCT/EP2017/062522
§ 371 (c)(1),
(2) Date: Nov. 30, 2018

(87) PCT Pub. No.: WO2017/207378
PCT Pub. Date: Dec. 7, 2017

(65) Prior Publication Data
US 2020/0180606 A1 Jun. 11, 2020

(30) Foreign Application Priority Data
May 30, 2016 (DE) .................. 10 2016 109 852

(51) Int. Cl.
*B60W 30/06* (2006.01)
*G05D 1/02* (2020.01)
*B62D 15/02* (2006.01)

(52) U.S. Cl.
CPC .......... *B60W 30/06* (2013.01); *G05D 1/0212* (2013.01); *B62D 15/027* (2013.01)

(58) Field of Classification Search
CPC .... B60W 30/06; G05D 1/0212; B62D 15/027
See application file for complete search history.

(56) References Cited

U.S. PATENT DOCUMENTS

2010/0204866 A1    8/2010  Moshchuk et al.
2011/0298639 A1*  12/2011  Kadowaki ............ B62D 15/027
                                                    340/932.2
(Continued)

FOREIGN PATENT DOCUMENTS

CN    101898559 A    12/2010
DE    10256770 A1     6/2004
(Continued)

OTHER PUBLICATIONS

International Search Report with Translation and Written Opinion Issued in Corresponding PCT Application No. PCT/EP2017/062522, dated Jul. 7, 2017 (13 Pages with English Translation of International Search Report).
(Continued)

*Primary Examiner* — Marthe Y Marc-Coleman
(74) *Attorney, Agent, or Firm* — Osha Bergman Watanabe & Burton LLP (57) ABSTRACT

A method for manoeuvring a motor vehicle into a parking space includes: determining a parking trajectory from a starting point to a destination point in the parking space, wherein the parking trajectory includes circular arcs, straight lines, and clothoids; manoeuvring the motor vehicle along the determined parking trajectory into the parking space; and determining an auxiliary trajectory with a plurality of sections from the starting point to the destination point. The auxiliary trajectory includes circular arcs and straight lines as the sections, a respective transition region is defined for
(Continued)

neighbouring sections, and a clothoid is determined for the respective transition regions. The parking trajectory is determined from the auxiliary trajectory in which the respective transition regions are replaced by the clothoids.

10 Claims, 5 Drawing Sheets

(56) References Cited

U.S. PATENT DOCUMENTS

| | | | |
|---|---|---|---|
| 2012/0089294 A1* | 4/2012 | Fehse | B60W 30/0956 |
| | | | 701/25 |
| 2012/0185113 A1* | 7/2012 | Pampus | B60W 30/06 |
| | | | 701/1 |
| 2016/0075329 A1 | 3/2016 | Tomozawa et al. | |

FOREIGN PATENT DOCUMENTS

| | | | |
|---|---|---|---|
| DE | 102005062084 A1 | 7/2006 | |
| DE | 102008058652 A1 | 5/2010 | |
| DE | 102010006738 A1 | 10/2010 | |
| DE | 102009027289 A1 * | 11/2010 | ......... B62D 15/0285 |
| DE | 102009027289 A1 | 11/2010 | |
| DE | 102009046155 A1 | 5/2011 | |
| EP | 2493746 B1 | 9/2015 | |
| JP | 2004-352120 A | 12/2004 | |
| JP | 2005-35498 A | 2/2005 | |
| WO | 01/14941 A1 | 3/2001 | |
| WO | 2005/085043 A1 | 9/2005 | |
| WO | 2014167255 A1 | 10/2014 | |

OTHER PUBLICATIONS

German Search Report Issued in Corresponding German Application No. 102016109852.3, dated Feb. 21, 2017 (7 Pages).

The Notification of Reason for Rejection issued in corresponding Japanese Application No. 2018-562614, dated Feb. 14, 2020 (10 pages).

The Notification of Reason for Rejection issued in corresponding Japanese Application No. 2018-562614, dated Jul. 17, 2020 (6 pages).

The First Office Action issued in corresponding Chinese Application No. 201780041605.7 dated Sep. 1, 2020 (5 pages).

* cited by examiner

METHOD FOR MANOEUVRING A MOTOR VEHICLE INTO A PARKING SPACE WITH DETERMINATION OF A PARKING TRAJECTORY, DRIVER ASSISTANCE SYSTEM AND MOTOR VEHICLE

CROSS-REFERENCE TO RELATED APPLICATIONS

This Application claims priority to International Application No. PCT/EP2017/062522 filed on May 24, 2017, which claims priority to German Application No. 102016109852.3 filed on May 30, 2016. The contents of these applications are incorporated herein by reference in their entirety.

BACKGROUND

The present invention relates to a method for manoeuvring a motor vehicle into a parking space in which a parking trajectory from a starting point to a destination point in the parking space is determined, wherein the parking trajectory is composed of circular arcs, straight lines and clothoids, and the motor vehicle is manoeuvred along the determined parking trajectory into the parking space. The invention additionally relates to a driver assistance system for a motor vehicle. The present invention lastly concerns a motor vehicle.

The interest here is in particular focused on driver assistance systems that assist a driver when parking the motor vehicle in a parking space. Driver assistance systems for this purpose, which can accordingly measure the parking space and then determine a parking trajectory along which the motor vehicle is moved into the parking space, are known from the prior art. With automatic parking aids of this type, the parking trajectory is planned before a parking manoeuvre is started or before a new movement along which the motor vehicle should then travel is started. On the one hand the parking trajectory is to be planned here in such a way that it is free from obstacles and, on the other hand, it is to be planned so that it can be driven by the motor vehicle as accurately as possible. The calculation of the parking trajectory can be very elaborate here, depending on how complex the assumed vehicle model is and how many objects or obstacles have to be considered in the planning of the parking trajectory.

Two different approaches with which the complexity should be reduced are taken by today's driver assistance systems or parking aids. A first approach consists in using the simplest possible geometrical segments or sections when determining the parking trajectory. The parking trajectory can, for example, be composed only of straight lines and circular arcs. An obstacle-free path can thus be planned in a relatively simple manner. The disadvantage is that, due to this simple description of the parking trajectory, the motor vehicle can only follow such a parking trajectory very imprecisely. It is, for example, necessary here for the steering angle to be changed suddenly at a transition from a circular arc to a straight line. This is, however, only possible if the motor vehicle stops at this transition and changes the steering angle through a steering action while stationary. In practice, however, the motor vehicle drives over the boundaries of the individual sections, and the steering angle of the new section cannot be maintained. This necessarily results in relatively large deviations from the parking trajectory. A second approach provides for planning the parking trajectory with more complex geometrical sections. Clothoids or polynomial functions can be used here in addition to circular arcs and straight lines in order to describe the parking trajectory. In order to reduce the complexity involved in the planning of a parking trajectory, it is usually necessary for the description of the obstacles to be simplified, or for the number of obstacles to be taken into account also to be reduced.

DE 10 2005 062 084 A1 describes in this respect a method for steering a motor vehicle into a parking space. A desired parking track along which the motor vehicle can be parked backwards into a parking space is determined here. For the calculation of the desired parking track, reference tracks, each of which is composed of a plurality of track sections, can be determined, wherein, starting from the parking space, at least two circular arcs with opposing curvature and a straight line are provided. It can further be provided that a double clothoid curve is inserted between the two circular arcs at an inflection point, and that a further clothoid curve is preferably inserted between the second circular arc and the straight line.

EP 2 493 746 B1 further describes a method for assisting a driver when parking in a longitudinal parking space. A parking trajectory that in general consists of straight sections, circular arcs and clothoids can be calculated here. Straight lines and circular arcs can, for example, here be joined by a clothoid. It is also provided that circular arcs with different radii are joined by a clothoid.

SUMMARY

It is the object of the present invention to indicate a solution as to how a parking trajectory of the type mentioned at the beginning can be determined in a simple manner in such a way that the motor vehicle can be manoeuvred along it precisely.

This object is achieved according to the invention by a method, by a driver assistance system and by a motor vehicle with the features according to the respective independent claims. Advantageous developments of the present invention are the objects of the dependent claims.

In one embodiment of a method for manoeuvring a motor vehicle into a parking space, a parking trajectory from a starting point to a destination point in the parking space is determined, wherein the parking trajectory is preferably composed of circular arcs, straight lines and clothoids. The motor vehicle furthermore is preferably manoeuvred into the parking space along the determined parking trajectory. In particular here, an auxiliary trajectory with a plurality of sections from the starting point to the destination point is determined, wherein the auxiliary trajectory comprises circular arcs and straight lines as the sections. A respective transition region is preferably defined for neighbouring sections, and a clothoid is determined for the respective transition regions. The parking trajectory is in particular determined from the auxiliary trajectory in which the respective transition regions are replaced by the clothoids.

A method according to the invention is used for manoeuvring a motor vehicle into a parking space. A parking trajectory from a starting point to a destination point in the parking space is determined here, wherein the parking trajectory is composed of circular arcs, straight lines and clothoids. The motor vehicle is, in addition, manoeuvred along the predetermined parking trajectory. An auxiliary trajectory with a plurality of sections from the starting point to the destination point is further determined, wherein the auxiliary trajectory comprises circular arcs and straight lines as the sections. A respective transition region is defined for neighbouring sections, and a clothoid is determined for the respective transition regions, wherein the parking trajectory is determined from the auxiliary trajectory in which the respective transition regions are replaced by the clothoids.

A driver of the motor vehicle should be assisted when parking the motor vehicle in the parking space with the aid of the method. The method can be carried out with a corresponding driver assistance system of the motor vehicle. The parking space can here first be recognized and measured with the aid of the driver assistance system. The driver assistance system can comprise appropriate distance sensors, ultrasonic sensors for example, for this purpose, with which the parking space, or objects which bound the parking space, can be recognized. The parking trajectory from the starting point to the destination point in the parking space can then be determined on the basis of the dimensions of the parking space and of the external dimensions of the motor vehicle. After the determination of the parking trajectory, the motor vehicle can then be manoeuvred into the parking space. It can, for example, be provided here that appropriate driving instructions are issued to the driver of the motor vehicle indicating how he should move the motor vehicle along the parking trajectory into the parking space. It is, however, preferably provided that the motor vehicle is manoeuvred at least semi-autonomously into the parking space with the aid of the driver assistance system. It can be provided here that the motor vehicle is manoeuvred semi-autonomously into the parking space. In this case, the driver assistance system performs an intervention in the steering of the motor vehicle in order to guide the motor vehicle along the determined parking trajectory. In this case, the driver of the motor vehicle continues to actuate the accelerator pedal and the brake. It can also be provided that the motor vehicle is parked into the parking space fully autonomously with the aid of the driver assistance system. The driver assistance system here also intervenes with a drive motor and the brake of the motor vehicle.

It is now provided according to the invention that the parking trajectory is determined in two sequential partial steps. In a first partial step, an auxiliary trajectory, which also extends from the starting point to the destination point in the parking space, is determined. The auxiliary trajectory here is composed of a plurality of adjacent or neighbouring sections. It is provided here that the auxiliary trajectory comprises only circular arcs and straight lines as the sections. In other words the auxiliary trajectory, which is composed only of circular arcs and straight lines, is thus first determined. The respective circular arcs and straight lines are determined while bearing the dimensions of the parking space and/or of the objects that bound the parking space in mind. The objects or obstacles that bound the parking space can, for example, be parked vehicles or kerbstones. The circular arcs and straight lines are, in addition, determined depending on the external dimensions of the motor vehicle and properties of the steering of the motor vehicle, for example a turning circle of the motor vehicle.

Once this auxiliary trajectory is determined, the parking trajectory is determined on the basis of the auxiliary trajectory in a second partial step. A transition region is determined here for each of the respectively adjacent sections of the auxiliary trajectory. This transition region thus in particular includes in each case a partial region of the neighbouring sections. A clothoid is then determined for each of the transition regions of the neighbouring sections. A section or a partial region of a clothoid is here also to be understood under the term clothoid. The auxiliary trajectory is used for determination of the parking trajectory, wherein, in the respective transition regions, the auxiliary trajectory is replaced by the respective clothoids. The auxiliary trajectory can thus first be determined on the basis of the geometry of the motor vehicle, of the parking space, and/or of the objects in the surroundings of the motor vehicle. A parking trajectory that can be followed precisely with the motor vehicle can then be determined from this simplified auxiliary trajectory, which only consists of circular arcs and straight lines, through the insertion of the respective clothoids. Because the clothoids are used in the transition regions, the transitions between the circular arcs and the straight lines, and the sudden changes of steering angle associated with them, can be smoothed. The advantage also emerges that the geometries of the parking spaces or of the objects in the surroundings of the motor vehicle no longer have to be taken into account in the determination of the respective clothoids in the transition regions. A parking trajectory that can nevertheless be precisely followed with the motor vehicle can thus be determined within a short computing time, or with a small computing effort.

The sections of the auxiliary trajectory are preferably determined in such a way that the circular arcs and the straight lines are arranged in alternation with one another. In other words, the auxiliary trajectory is determined in such a way that circular arcs and straight lines are arranged in alternation with one another from the starting point to the destination point in the parking space. A parking trajectory for different types of parking spaces can be determined on the basis of the auxiliary trajectory. The parking space can, for example, be a longitudinal parking space into which the motor vehicle can be parked backwards or forwards. The parking space can also be a transverse parking space or a diagonal parking space into which the motor vehicle can be parked forwards or backwards. In the simplest case, the auxiliary trajectory can, for example, be composed of only one circular arc and of one straight line. Because the auxiliary trajectory is composed of an alternating arrangement of circular arcs and straight lines, the respective clothoids in the transition region between neighbouring sections can be determined precisely and with a low computing effort.

In the respective transition regions, a circular-arc section of the circular arc and/or a straight-line section of the straight line, which are replaced by the respective clothoids in the determination of the parking trajectory, are preferably determined. When the two neighbouring sections of the auxiliary trajectory are a circular arc and a straight line, a circular-arc section of the circular arc and a straight-line section of the straight line, which then define the transition region, are determined. When determining the parking trajectory, the circular-arc section of the circular arc and the straight-line section of the straight line are then replaced by the clothoids. The sudden change in the course of the auxiliary trajectory between the circular arc and the straight line can be smoothed through the insertion of the clothoid. The motor vehicle can thus altogether be moved along the parking trajectory at a higher speed.

An auxiliary circular arc is preferably determined for the circular arc for the determination of the respective clothoid, wherein a radius of the auxiliary circular arc is smaller than a radius of the circular arc, and the auxiliary circular arc touches the circular arc at a fixed point. An appropriate spacing is to be determined so that a clothoid can be inserted between a circular arc and a straight line. This spacing is created in that the radius of the circular arc is, so to speak, made smaller. The auxiliary circular arc whose radius is smaller when compared with the radius of the originally determined circular arc is determined for this purpose. The difference between the radius of the circular arc and the radius of the auxiliary circular arc then describes the spacing. The auxiliary circular arc is determined here in such a way that it touches the circular arc at a fixed point. The circular-arc section that is then replaced by a part of the clothoid extends from the fixed point to a contact point to which the neighbouring section of the auxiliary trajectory is adjacent. The contact point thus, for example, describes the region at which the circular arc and the straight lines are adjacent to one another. Starting from the auxiliary circular arc which has a smaller radius when compared with the circular arc, the clothoid can then be determined, starting from the fixed point, with low computing effort.

It is furthermore advantageous if the auxiliary circular arc is determined in such a way that the fixed point is arranged at a centre of the circular arc if a section of the auxiliary trajectory is adjacent at both ends of the circular arc, or that the fixed point corresponds to the starting point of the auxiliary trajectory if the circular arc includes the starting point, or that the fixed point corresponds to the destination point of the auxiliary trajectory if the circular arc includes the destination point. If the circular arc for which the auxiliary circular arc should be determined is located at the start of the auxiliary trajectory, the circular arc includes the starting point of the auxiliary trajectory. In this case, the fixed point can be placed at the starting point of the auxiliary trajectory, and the clothoid can be determined starting from there. The same applies to the case in which the circular arc for which the auxiliary circular arc should be determined forms the end of the auxiliary trajectory and thus includes the end point. If the circular arc for which the auxiliary circular arc should be determined is adjacent at both ends to a straight line as a section of the auxiliary trajectory, the fixed point can be defined at a centre of the circular arc. The clothoid can thus be defined in both directions starting from the fixed point. It can, in principle, also be provided that the fixed point is defined away from the centre of the circular arc, if a straight line is adjacent to both ends of the circular arc. In this case, the circular arc is then divided asymmetrically by the fixed point. In that the fixed point is determined centrally in the circular arc, it can be determined in a simple manner and with little computing effort.

In a further embodiment, a difference is determined between the radius of the circular arc and the radius of the auxiliary circular arc on the basis of an angle of a circular segment assigned to the circular-arc section of the circular arc, wherein the angle extends from the fixed point to a contact point of the circular arc with the neighbouring section. A circular segment can be assigned to the circular-arc section of the auxiliary trajectory that should be replaced by the clothoid. From this circular segment, it is now possible to determine the angle that extends from the fixed point to the contact point at which, for example, the circular arc touches the neighbouring straight line. As already explained, a spacing is to be determined in order to define the clothoid between the circular arc and the straight line. This spacing is defined by the difference between the radius of the circular arc and the radius of the auxiliary circular arc. This can now be determined, depending on the angle of the circular segment. Altogether the clothoid can now be determined, depending on the circular-arc section that should be replaced by the clothoid, in such a way that the clothoid exhibits the lowest possible change in curvature.

According to a further embodiment, the difference between the radius of the circular arc and the radius of the auxiliary circular arc is determined with reference to a length of the straight-line spacing of the neighbouring straight line. The straight-line section of the straight line that should be replaced by the clothoid can also be taken into account in the determination of the clothoid. The straight-line section that should be replaced by the clothoid can be defined first. The difference, or the spacing, between the radius of the circular arc and the radius of the auxiliary circular arc can then be determined depending on the length of this straight-line section. Determining a clothoid with a minimum change in the curvature in a simple manner can be achieved in this way.

In principle it can also be provided that the difference between the radius of the circular arc and the radius of the auxiliary circular arc is determined on the basis of respective straight-line sections of the straight lines that are adjacent to the circular arc at both ends.

It can be provided here that the fixed point of the circular arc is not defined in the centre of the circular arc. In this case, different straight-line sections can also arise for the straight lines that are adjacent to the circular arc at the one end and at the other end. In this case the auxiliary circular arc can furthermore be determined in such a way that the conditions for the respective transitions to the adjacent straight lines are satisfied.

The respective clothoids in the transition regions are preferably determined in such a way that a change in the curvature of the clothoid is minimum. This makes it possible for the motor vehicle to follow the parking trajectory at the highest possible speed during the parking procedure.

In principle it can also be provided that the motor vehicle is parked into the parking space in a plurality of sequential moves. A change in the direction of travel of the motor vehicle here takes place between the moves. The motor vehicle can, for example, be moved first backwards in a first movement, forwards in a second movement and finally backwards again in a third movement. It is in particular provided here that a parking trajectory is determined for each of the movements, wherein the auxiliary trajectory is determined first for determining the parking trajectory.

A driver assistance system according to the invention is designed for carrying out a method according to the invention. The driver assistance system can, for example, comprise a plurality of sensors with which the parking space can be measured. In addition to this, the driver assistance system can comprise a control apparatus which can, for example, be formed by an electronic control device of the motor vehicle. The auxiliary trajectory can then first be determined with the aid of the control apparatus, and the parking trajectory determined on the basis of the auxiliary trajectory. The driver assistance system is, furthermore, designed to manoeuvre the motor vehicle along the determined parking trajectory at least semi-autonomously.

A motor vehicle according to the invention comprises a driver assistance system according to the invention. The motor vehicle is, in particular, designed as a passenger car.

The preferred embodiments presented with reference to the method according to the invention and their advantages apply correspondingly to the driver assistance system according to the invention, and to the motor vehicle according to the invention.

Further features of the invention emerge from the claims, the figures and the description of the figures. The features and feature combinations referred to in the description above, as well as the features and feature combinations referred to below in the description of the figures and/or only illustrated in the figures, can not only be used in the respectively indicated combinations, but also in other combinations or alone without going beyond the scope of the invention. Embodiments of the invention that are not explicitly shown and explained in the figures, but which emerge and can be developed from combinations of separate features from the embodiments that are explained, are thus to be deemed as comprised and disclosed. Embodiments and combinations of features which thus do not exhibit all the features of an originally formulated independent claim are also to be deemed to be disclosed. Embodiments and feature combinations, in particular of the embodiments disclosed above, which go beyond or deviate from feature combinations disclosed in the back-references of the claims are, in addition, to be deemed as disclosed.

The invention is now explained in more detail with reference to preferred exemplary embodiments, and also with reference to the appended drawings.

BRIEF DESCRIPTION OF DRAWINGS

Here.

DETAILED DESCRIPTION

The same reference codes are given in the figures to identify elements that are identical and have the same functions.

Figure 1:
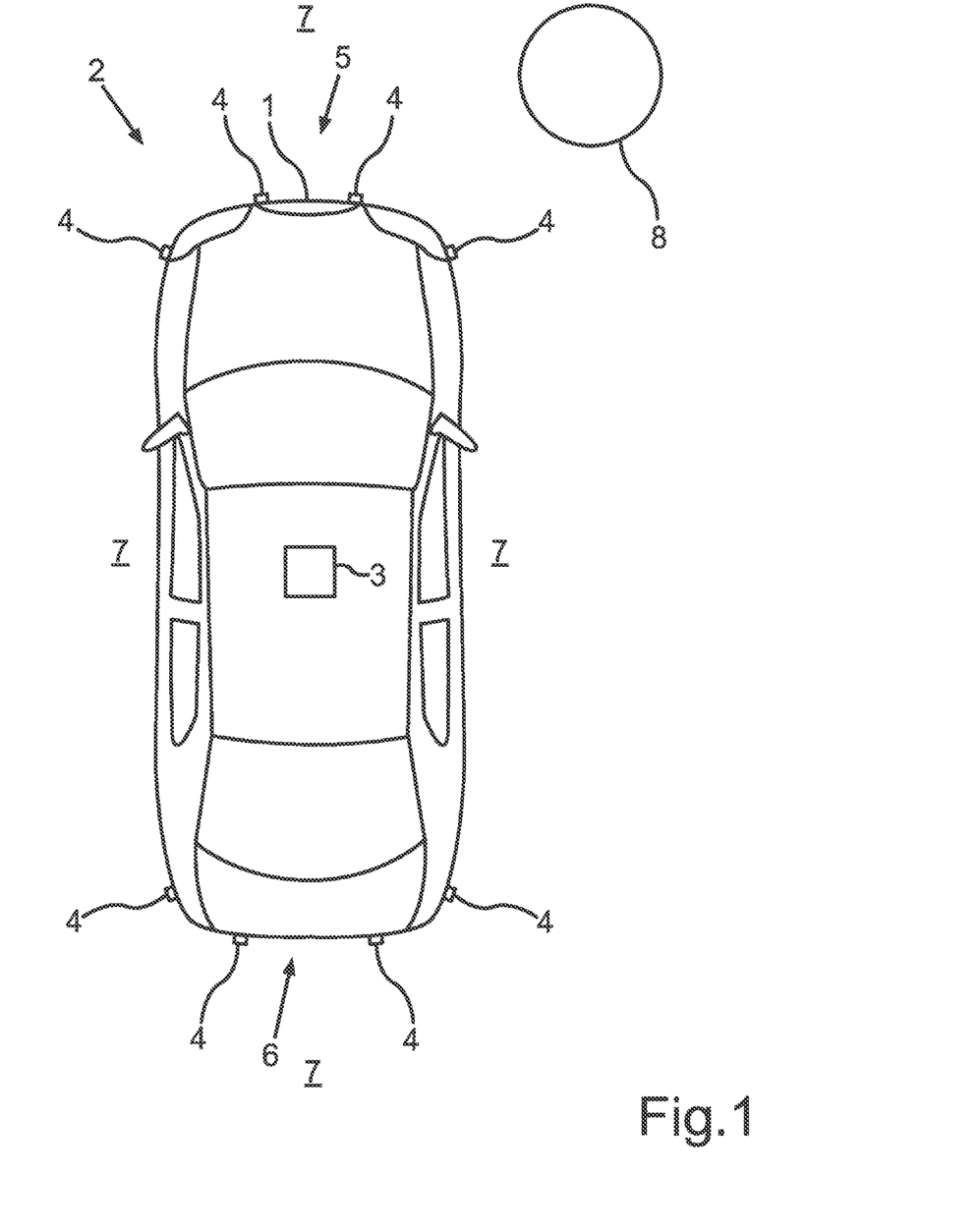
FIG. 1 shows a motor vehicle according to an embodiment of the present invention which comprises a driver assistance system.

FIG. 1 shows a view from above of a motor vehicle 1 according to one embodiment of the present invention. The motor vehicle 1 is in the present case designed as a passenger car. The motor vehicle 1 comprises a driver assistance system 2 whose purpose is to assist a driver when driving the motor vehicle 1. The driver assistance system 2 serves in particular to assist the driver when parking the motor vehicle 1 in a parking space.

The driver assistance system 2 comprises a plurality of sensors 4 with which objects 8 in a surroundings 7 of the motor vehicle 1 can be detected. The sensors 4 can, for example, be formed as ultrasonic sensors. In the present case the driver assistance system 2 comprises eight sensors 4, wherein four sensors 4 are arranged in a front region 5 and four sensors 4 are arranged in a rear region 6 of the motor vehicle 1. The sensors 4 are furthermore connected for data transmission to a control apparatus 3 of the driver assistance system 2. When objects 8 that bound the parking space are detected with the sensors 4, the dimensions of the parking space can be determined with the aid of the control apparatus 3. A parking trajectory 9 (see FIG. 7), along which the motor vehicle 1 can be manoeuvred into the parking space, can furthermore be determined with the control apparatus 3.

Figure 2:
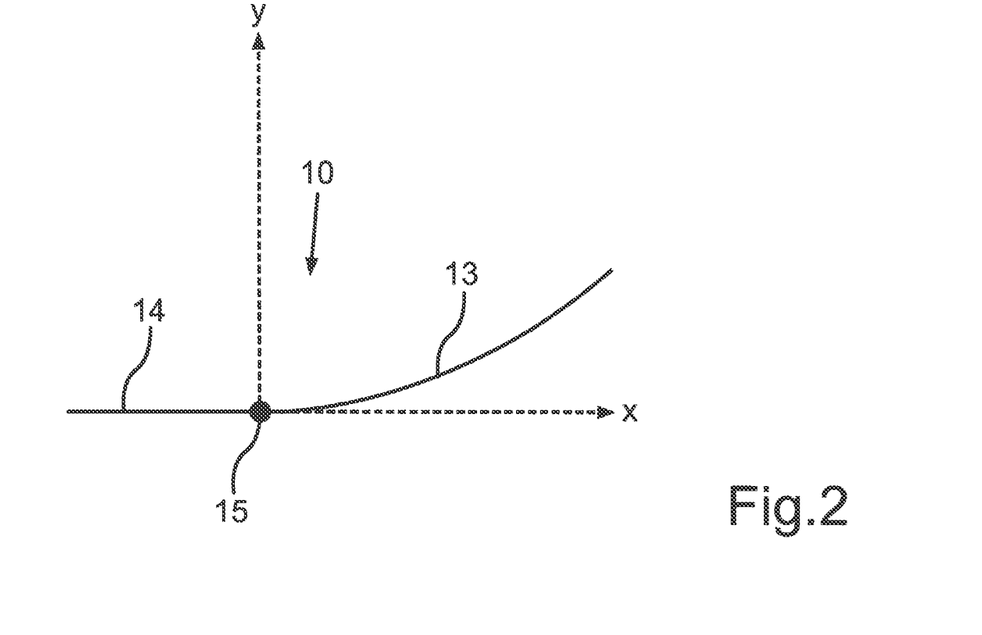
FIG. 2 shows an illustration of a detail of an auxiliary trajectory that is determined for the determination of a parking trajectory, wherein the auxiliary trajectory comprises a straight line and a circular arc.

The determination of the parking trajectory 9 with the aid of the control apparatus 3 takes place in this case in two sequential partial steps. In a first partial step, an auxiliary trajectory 10 (see FIG. 4), which extends from a starting point 11 to a destination point 12 in the parking space, is determined. It is provided here that the auxiliary trajectory 10 is composed of a plurality of sections. The auxiliary trajectory 10 only comprises circular arcs 13, 13' and straight lines 14, 14' as the sections. The respective circular arcs 13, 13' and the straight lines 14, 14' are determined with reference to the dimensions of the parking space and the external dimensions of the motor vehicle 1. In this connection, FIG. 2 shows an illustration of a detail of the auxiliary trajectory 10, of which a circular arc 13 and a straight line 14 are illustrated here. The circular arc 13 and the straight line 14 touch at a contact point 15.

Figure 3:
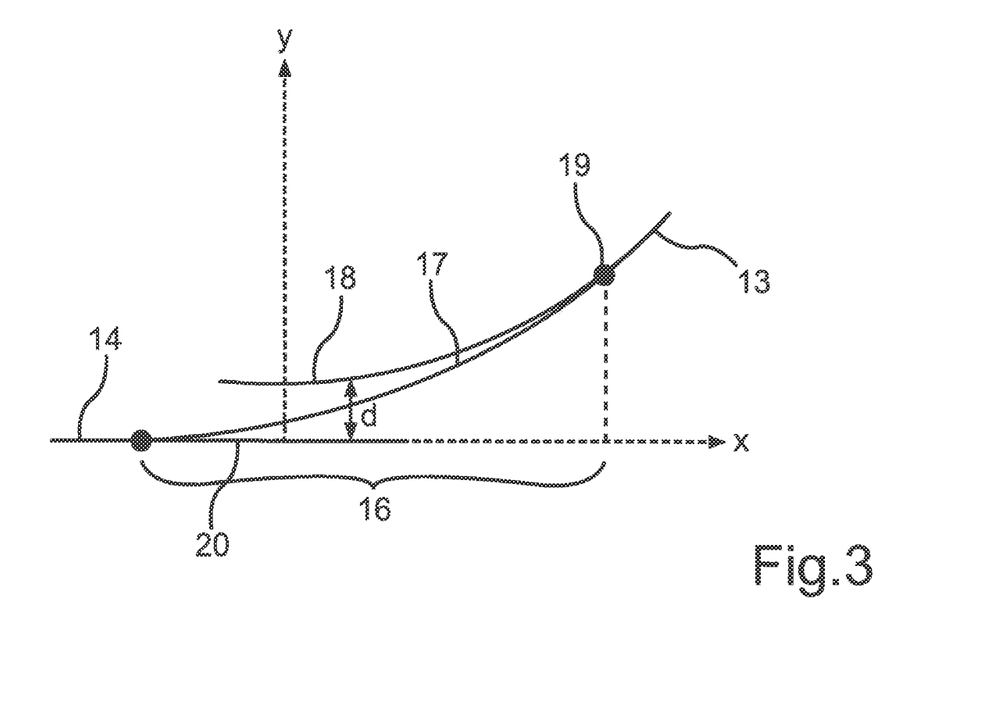
FIG. 3 shows an auxiliary circular arc and a clothoid that partially replaces the circular arc and the straight line in a transition region.

Transition regions 16 are defined for neighbouring sections of the auxiliary trajectory 10 in a second partial step of the determination of the parking trajectory 9. Clothoids 17 are then determined for the respective transition regions 16. This is made clear schematically with reference to FIG. 3. The circular arc 13 and the straight line 14 of FIG. 2, which are replaced by the clothoid 17 in the transition region 16, are shown there. The transition region 16 comprises a straight-line section 20 of the straight line 14, which is partially replaced by the clothoid 17. A circular-arc section of the circular arc 13, which is not illustrated here, is also replaced by the clothoid 17. To determine the clothoid 17, an auxiliary circular arc 18 is first determined. This auxiliary circular arc 18 here has a radius R which is smaller than a radius of the circular arc 13. A difference d or spacing between the radius of the circular arc 13 and the radius R of the auxiliary circular arc 18 is illustrated here in FIG. 3. The auxiliary circular arc 18 is determined here in such a way that it touches the circular arc 13 at a fixed point 19.

Figure 4:
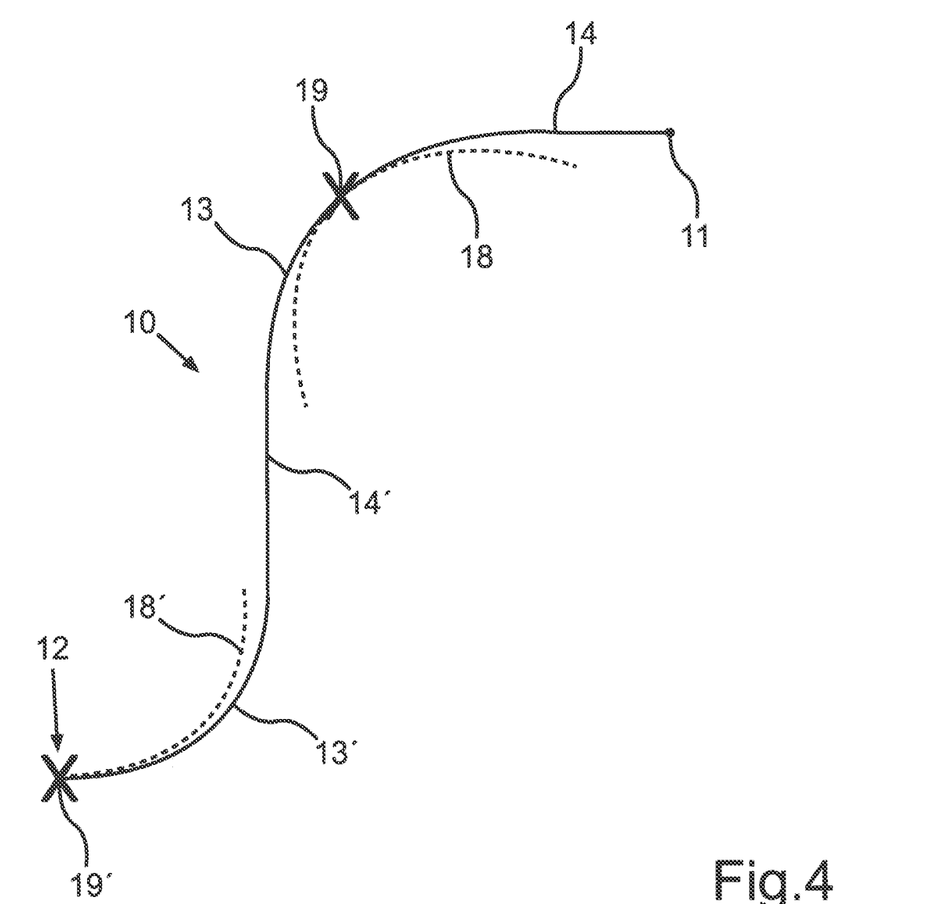
FIG. 4 shows an auxiliary trajectory that is composed of circular arcs and straight lines as well as auxiliary circular arcs for the circular arc.

The determination of the respective fixed point 19, 19' for the circular segments 13, 13' is explained below with reference to FIG. 4, which shows the auxiliary trajectory 10 that extends from the starting point 11 to the destination point 12. Beginning from the starting point 11, the auxiliary trajectory 10 comprises a first straight line 14 which connects to the starting point 11. The auxiliary trajectory 10 furthermore comprises a first circular arc 13 which connects to the first straight line 14. The auxiliary trajectory 10 furthermore comprises a second straight line 14' that connects to the first circular arc 13. A second circular arc 13', which contains the destination point 12, connects to the second straight line 14'. The first circular arc 13 comprises a transition to a straight line 14, 14' at both ends. In this case the fixed point 19 is defined such that it is located centrally in the circular arc 13. The first auxiliary circular arc 18 for the first circular arc 13, which touches the circular arc 13 at the fixed point 19, is furthermore illustrated in FIG. 4. For the second circular arc 13, the second fixed point 19' is determined at the destination point 12, since the second circular segment 13', or the auxiliary trajectory 10, ends here. In this case, the clothoid 19 is only required in the direction of the second straight line 14'. Here again, the auxiliary circular arc 18' corresponding to the second circular arc 13' is illustrated.

Figure 5:
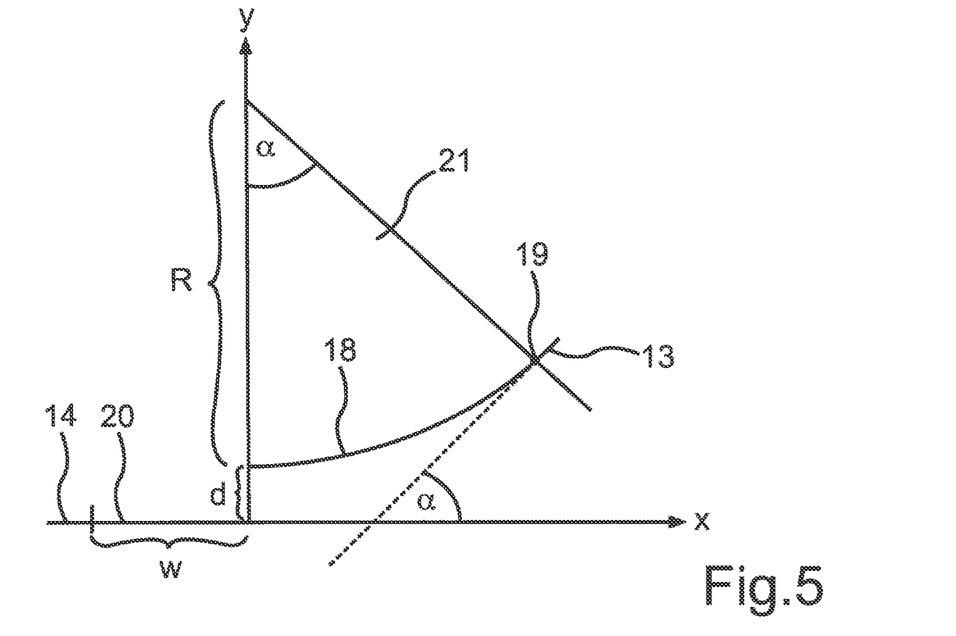
FIG. 5 shows an auxiliary circular arc that is determined depending on a straight-line section of the straight line and a circular-arc section of the circular segment.

FIG. 5 shows a schematic illustration of the auxiliary circular arc 18 that is determined depending on the straight-line section 20 and the circular-arc section that is replaced by the clothoid 17. A circular segment 21, which is assigned to the circular-arc section of the circular arc 13 that should be replaced by the clothoid 17, is determined for this purpose. This circular segment 21 encloses an angle α that extends from the fixed point 19 to the contact point 15. In this case, the difference d between the radius of the circular arc 13 and the radius R of the auxiliary circular arc 18 should now be determined. The y-component $y_{kr}$ of the circular arc 13 can first be determined for this purpose. This is found from the circle equation:

$$y_{kr}=(1-\cos(\alpha))*R.$$

The y-component $y_{kr}$ of the circular arc 13 can then be approximated in that the cosine function is approached by a Taylor series:

$$y_{kr}=(1-(1-\alpha^2/2))*R=\alpha^2/2.$$

The y-component $y_{kl}$ of the clothoid 17 can be approximated by the following formula:

$$y_{kl}=L*\alpha/3.$$

L here describes the length of the clothoid corresponding to $L=2*R*\alpha$. The y-component $y_{kl}$ of the clothoid 17 can thus be described as follows:

$$y_{kl}=\tfrac{2}{3}*\alpha^2*R.$$

The difference d results from the difference between the y-component $y_{kl}$ of the clothoid 17 and the y-component $y_{kr}$ of the circular segment 13:

$$d=y_{kl}-y_{kr}=\tfrac{2}{3}*\alpha^2*R-(1-\cos-(\alpha))*R.$$

This yields:

$$d=\tfrac{1}{6}*\alpha^2*R \text{ and}$$

$$d/R=\tfrac{1}{6}*L*\alpha^2.$$

In the same way, the difference d can be determined depending on a length w of the straight-line section 20 that should be replaced by the clothoid 17. The x-component $x_{kr}$ of the circular arc can first be determined for this purpose:

$$x_{kr}=\sin(\alpha)*R\approx\alpha*R.$$

The x-component $x_{kl}$ of the clothoid 17 can furthermore be determined:

$$x_{kl}=L=2*R*\alpha.$$

The length w of the straight-line section 20 results from the difference between the x-component $x_{kl}$ of the clothoid 17 and the x-component $x_{kr}$ of the circular arc 13:

$$w=x_{kl}-x_{kr}=2*R*\alpha-R*\alpha=R*\alpha.$$

Substituting $\alpha^2=w^2/R^2$ in $d=\tfrac{1}{6}*\alpha^2*R$ results in:

$$d=\tfrac{1}{6}*w^2/R.$$

Figure 6:
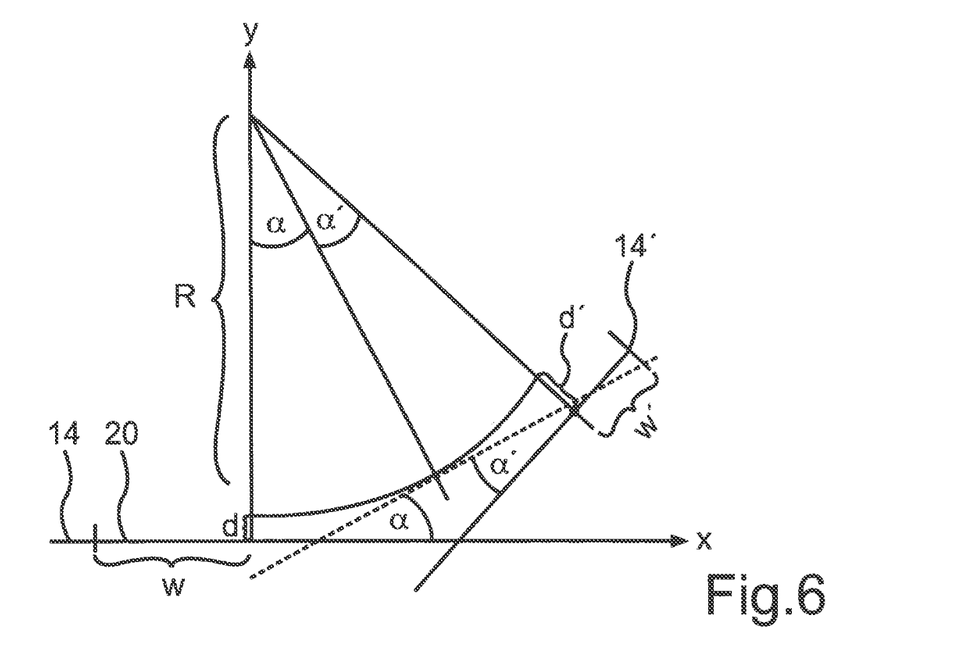
FIG. 6 shows a circular arc according to a further embodiment.

FIG. 6 furthermore shows an example in which the fixed point 19 is not defined centrally in the circular arc 13. A ratio between the spacing d for the straight line 14 that bounds the circular arc 13 at the first end and the second straight line 14' that bounds the circular arc 13 at the opposite end, and the difference d' at this end can be determined here:

$$d/d'=\tfrac{1}{6}*w^2/R/(\tfrac{1}{6}*w'^2/R).$$

From this it follows that:

$$w/w'=\sqrt{d/d'}.$$

The difference d can thus be determined on the basis of the angle α of the circular segment 21, the length w of the straight-line section 20 and of the further difference d'. Three criteria for the determination of the distance d result, wherein the minimum of those determined on the basis of the three criteria is chosen for d.

Figure 7:
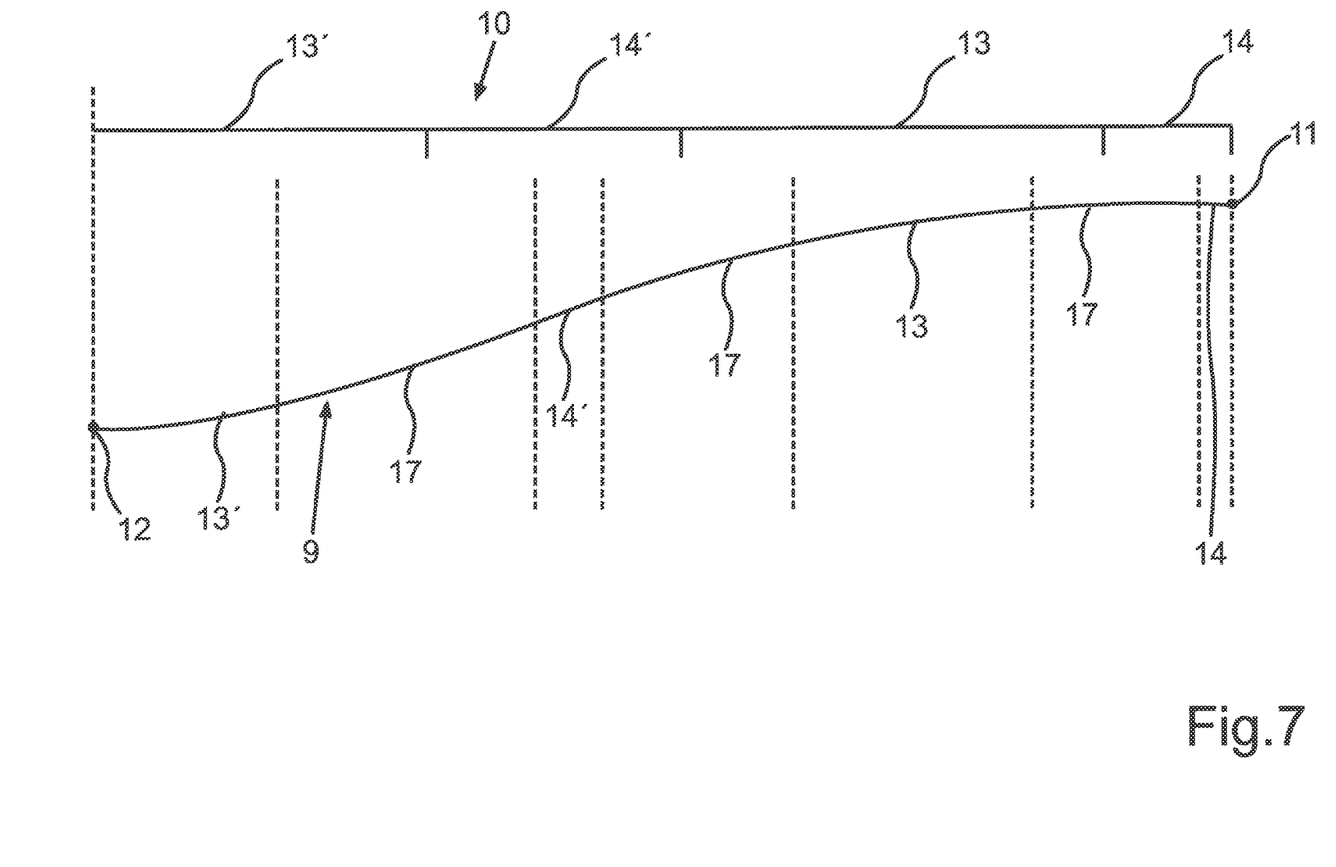
FIG. 7 shows the parking trajectory that is determined on the basis of the auxiliary trajectory.

FIG. 7 shows the parking trajectory 9 that is determined on the basis of the auxiliary trajectory 10, wherein the auxiliary trajectory 10 is replaced by the respective clothoid 17 in the transition regions 16. The respective sections or circular segments 13, 13' and straight lines 14, 14' of the auxiliary trajectory 10 are illustrated over the parking trajectory 9. The motor vehicle 1 can be manoeuvred, for example backwards, into a longitudinal parking space along the parking trajectory 9.

The invention claimed is:

1. A method for manoeuvring a motor vehicle into a parking space, the method comprising:
   determining a parking trajectory from a starting point to a destination point in the parking space, wherein the parking trajectory is composed of circular arcs, straight lines and clothoids;
   manoeuvring the motor vehicle along the determined parking trajectory into the parking space; and
   determining an auxiliary trajectory with a plurality of sections from the starting point to the destination point,
   wherein the auxiliary trajectory comprises circular arcs and straight lines as the sections, a respective transition region is defined for neighbouring sections, and a clothoid is determined for the respective transition regions,
   wherein the parking trajectory is determined from the auxiliary trajectory in which the respective transition regions are replaced by the clothoids, and
   wherein the sections of the auxiliary trajectory are determined so that the circular arcs and the straight lines are arranged in alternation with one another.

2. The method according to claim 1, wherein a circular-arc section of the circular arc and/or a straight-line section of the straight line is determined for defining the respective transition regions, which is replaced by the respective clothoid when determining the parking trajectory.

3. The method according to claim 1, wherein to determine respective clothoids an auxiliary circular arc is determined for the circular arc, wherein a radius of the auxiliary circular arc is smaller than a radius of the circular arc, and the auxiliary circular arc touches the circular arc at a fixed point.

4. The method according to claim 3, wherein the auxiliary circular arc is determined in such a way that the fixed point is arranged at a centre of the circular arc if a section of the auxiliary trajectory is adjacent at both ends of the circular arc, or that the fixed point corresponds to the starting point of the auxiliary trajectory if the circular arc includes the starting point, or that the fixed point corresponds to the destination point of the auxiliary trajectory if the circular arc includes the destination point.

5. The method according to claim 3, wherein a difference is determined between the radius of the circular arc and the radius of the auxiliary circular arc on the basis of an angle of a circular segment assigned to the circular-arc section of the circular arc, wherein the angle extends from the fixed point to a contact point of the circular arc with the neighbouring section.

6. The method according to claim 3, wherein the difference between the radius of the circular arc and the radius of the auxiliary circular arc is determined with reference to a length of the straight-line section of the neighbouring straight line.

7. The method according to claim 1, wherein the respective clothoid in the transition regions is determined such that a change in the curvature of the clothoid is minimum.

8. A driver assistance system for a motor vehicle, the driver assistance system comprising a processor coupled to a memory, the processor coupled to the memory being configured to:
- manoeuvre a motor vehicle into a parking space by determining a parking trajectory from a starting point to a destination point in the parking space, wherein the parking trajectory is composed of circular arcs, straight lines and clothoids, and
- wherein the motor vehicle is manoeuvred along the determined parking trajectory into the parking space;
- determine an auxiliary trajectory with a plurality of sections from the starting point to the destination point, wherein the auxiliary trajectory comprises circular arcs and straight lines as the plurality of sections,
- define a respective transition region for neighbouring sections, and
- determine a clothoid for the respective transition regions,
- wherein the parking trajectory is determined from the auxiliary trajectory in which the respective transition regions are replaced by the clothoids, and
- wherein the sections of the auxiliary trajectory are determined so that the circular arcs and the straight lines are arranged in alternation with one another.

9. The driver assistance system according to claim 8, wherein the driver assistance system manoeuvres the motor vehicle at least semi-autonomously along the parking trajectory.

10. A motor vehicle with a driver assistance system according to claim 8.

* * * * *